United States Patent
Rodenas et al.

(10) Patent No.: US 6,367,576 B1
(45) Date of Patent: Apr. 9, 2002

(54) METHOD AND SYSTEM FOR APPLYING RETURN TORQUE IN A VEHICLE POWER STEERING SYSTEM

(75) Inventors: Yves J Rodenas, Saginaw, MI (US); Djilani P Merzoug, Hattersheim; Kathryn Lynn Pattok, Velpke, both of (DE); William Henry Wittig, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/648,815

(22) Filed: Aug. 25, 2000

Related U.S. Application Data

(60) Provisional application No. 60/123,456, filed on Mar. 9, 2000.

(51) Int. Cl.[7] .................................................. B62D 5/04
(52) U.S. Cl. ........................................ 180/446; 701/42
(58) Field of Search ................................ 180/443, 446, 180/421, 422; 701/41, 42

(56) References Cited

U.S. PATENT DOCUMENTS

| | | | |
|---|---|---|---|
| 5,668,722 A | | 9/1997 | Kaufmann et al. |
| 5,790,966 A | * | 8/1998 | Madau et al. |
| 5,919,241 A | | 7/1999 | Bolourchi et al. |
| 6,039,144 A | * | 3/2000 | Chandy et al. |
| 6,050,360 A | * | 4/2000 | Pattok et al. |

FOREIGN PATENT DOCUMENTS

JP  2000-25635  * 1/2000

* cited by examiner

*Primary Examiner*—Kevin Hurley
(74) *Attorney, Agent, or Firm*—Edmund P. Anderson

(57) ABSTRACT

An exemplary embodiment of the invention is a method for controlling application of return torque in a vehicle power steering system. The method includes detecting a current hand wheel center and comparing the current hand wheel center to a previous hand wheel center. A change in hand wheel center is detected in response to the comparison. Application of return torque is controlled in response to detecting a change in hand wheel center.

14 Claims, 3 Drawing Sheets

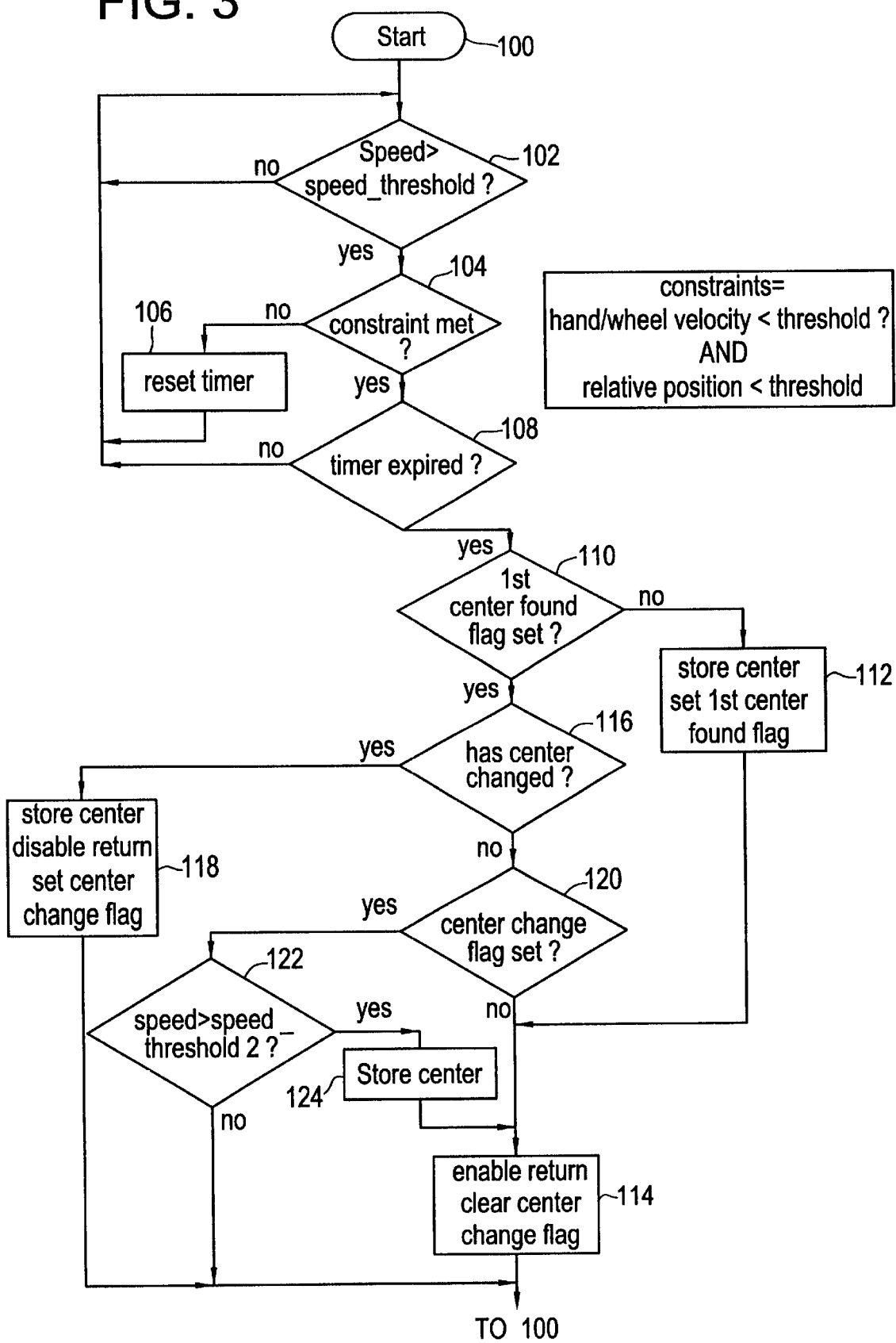

METHOD AND SYSTEM FOR APPLYING RETURN TORQUE IN A VEHICLE POWER STEERING SYSTEM

PRIOR HISTORY

This application is based upon, and claims the benefit of, U.S. Provisional Application No. 60/123,456, filed Mar. 9, 2000, which is herein incorporated in its entirety by reference.

TECHNICAL FIELD

The invention relates to a method and system for applying return torque in a vehicle power steering system.

BACKGROUND OF THE INVENTION

Some vehicle power steering systems use an actuator coupled to the steering shaft to provide power assist in vehicle steering. It is often desirable in such systems to provide a return torque command to the actuator so as to help return the steering gear to a centered position and provide a stable steering feel to the vehicle operator. Such a return torque command is generated as a function of steering position, provided the steering position is known. Rotational position sensors having high resolution and other desirable characteristics may be coupled to the steering shaft to provide an output voltage varying in a substantially linear manner from a first voltage to a second voltage through a rollover angle comprising an entire 360 degree rotation or some sub-multiple thereof. The steering shaft, however, typically rotates through a plurality of such revolutions or sub-multiple angles, and therefore a plurality of repetitions of the rollover angle, as the rack is moved from one end to the other of its operational range. Thus, a sensor directly coupled to the steering shaft for maximum resolution in the output signal is similarly rotated through a plurality of repetitions of the output voltage range and produces a rollover transition at the end of each repetition when the voltage jumps from one extreme to the other. The output of a sensor so coupled does not by itself provide a unique absolute steering position, rather, it provides a set of steering positions separated by a rollover angle corresponding to the full output voltage range. It is thus necessary, in order to know the absolute rotational position, to compensate the sensor output signal for such rollover transitions in order to locate the absolute center position.

Once such compensation utilizes known relationships between hand wheel torque and absolute hand wheel position for given speeds. Based on vehicle dynamics, an envelope relating hand wheel torque and absolute hand wheel position is derived for one or more vehicle speeds. Once a given speed is reached, the hand wheel torque (measured through torque sensors) and the hand wheel position (derived from a position sensor) is compared to the envelope. If the hand wheel torque and hand wheel position are outside the envelope, then a correction is applied until the proper position is found.

The relationships between hand wheel torque and absolute hand wheel position are derived based on predetermined vehicle dynamics and driving conditions. When the driving conditions change from those used to establish the envelope, the hand wheel torque and hand wheel position may not provide accurate results. For example, hand wheel torque when driving on pavement will be different than hand wheel torque when driving on ice. An envelope derived based on driving on pavement may not be accurate under other conditions such as driving on ice.

BRIEF SUMMARY OF THE INVENTION

An exemplary embodiment of the invention is a method for controlling application of return torque in a vehicle power steering system. The method includes detecting a current hand wheel center and comparing the current hand wheel center to a previous hand wheel center. A change in hand wheel center is detected in response to the comparison. Application of return torque is controlled in response to detecting a change in hand wheel center.

BRIEF DESCRIPTION OF THE DRAWINGS

FIG. 3 is a flowchart of an exemplary process for controlling application of return torque.

DETAILED DESCRIPTION OF THE INVENTION

Figure 1:
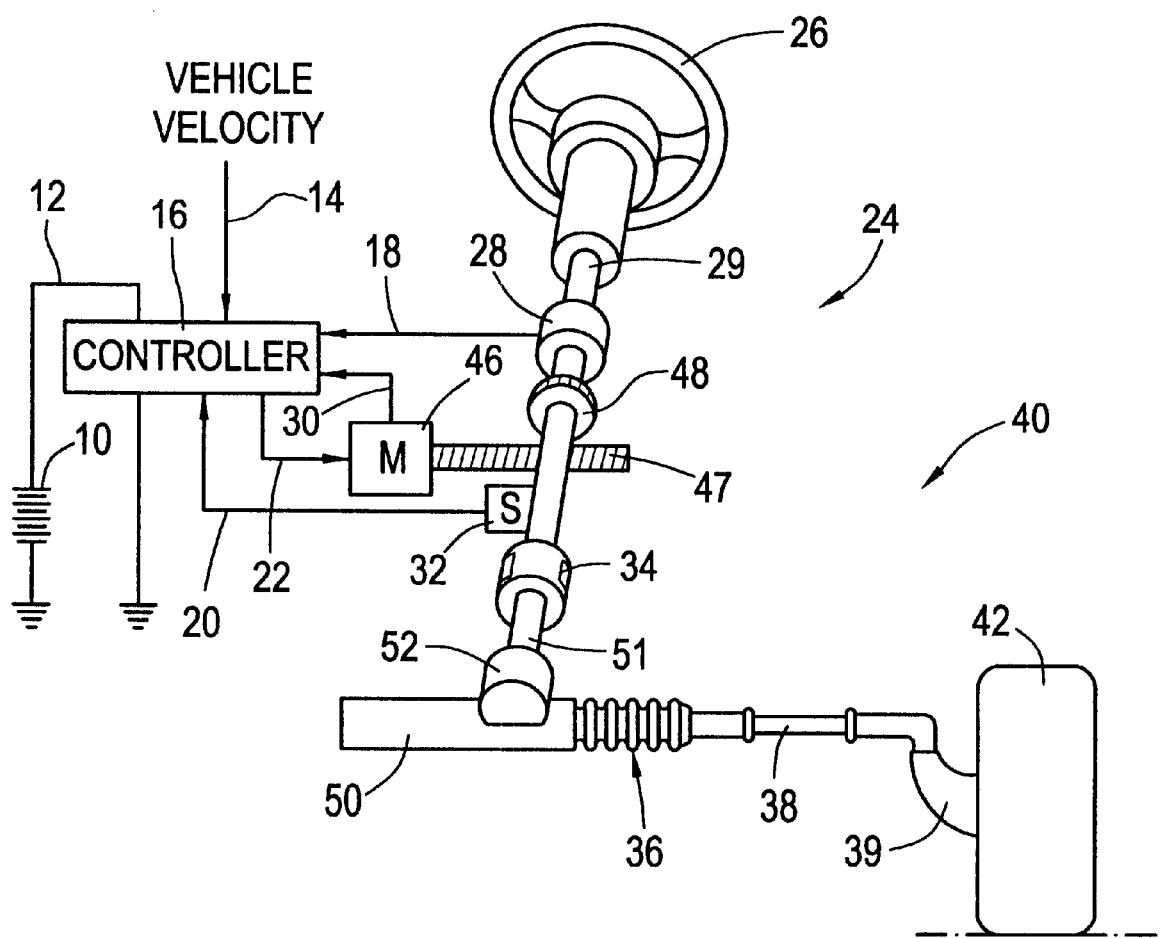
FIG. 1 shows a vehicle power steering system that provides an environment for application of the invention.

Referring to FIG. 1, a motor vehicle 40 is provided with a power steering system 24, which in this embodiment is an electric power steering system. Power steering system 24 may comprise a conventional rack and pinion steering mechanism 36, which includes a toothed rack 50 and a pinion gear (not shown ) under gear housing 52. As a hand wheel 26 is turned by a vehicle operator, an upper steering shaft 29 turns a lower shaft 51 through a universal joint 34; lower steering shaft 51 turns the pinion gear. Rotation of the pinion gear moves the rack, which moves the tie rods 38 (only one shown), which move steering knuckles 39 (only one shown) to turn steering wheels 42 (only one shown).

Power assist is provided through a controller 16 an d a power assist actuator comprising an electric motor 46. Controller 16 receives electric power from a vehicle electric power source 10 through a line 12, a signal representative of the vehicle velocity on line 14, and steering pinion gear angle signal from a rotational position sensor 32 on line 20. As hand wheel 26 is turned, a torque sensor 28 senses the torque applied to hand wheel 26 by the vehicle operator and provides a hand wheel torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor currents and provides such currents through a bus 22 to motor 46, which supplies torque assist to steering shaft 29, 51 through worm 47 and worm gear 48. If torque sensor 28 is the type which requires upper steering shaft 29 to be separated at the sensor between upper and lower sections allowing some range of rotational independence, both rotational position sensor 32 and worm gear 48 are associated with the lower section of the steering shaft, below torque sensor 28 as shown.

Rack 50 and its associated pinion gear of steering system 24 have a center position, in which steering wheels 42 are directed straight ahead relative to vehicle 40. It is an object of power steering system 24 to provide a return torque that assists in returning the steering system to a center position from either side thereof and provides the vehicle operator with a stable steering response and feel. In power steering system 24, this return torque is generated by electric motor 46; a return torque component of the total desired torque signal is generated in controller 16. The desired return torque is typically programmed into controller 16 as a function of the absolute steering position: that is, the deviation in both directions from center of rack 50 and the pinion gear. Thus, an accurate signal of steering position must be derived from rotational position sensor 32.

Figure 2:
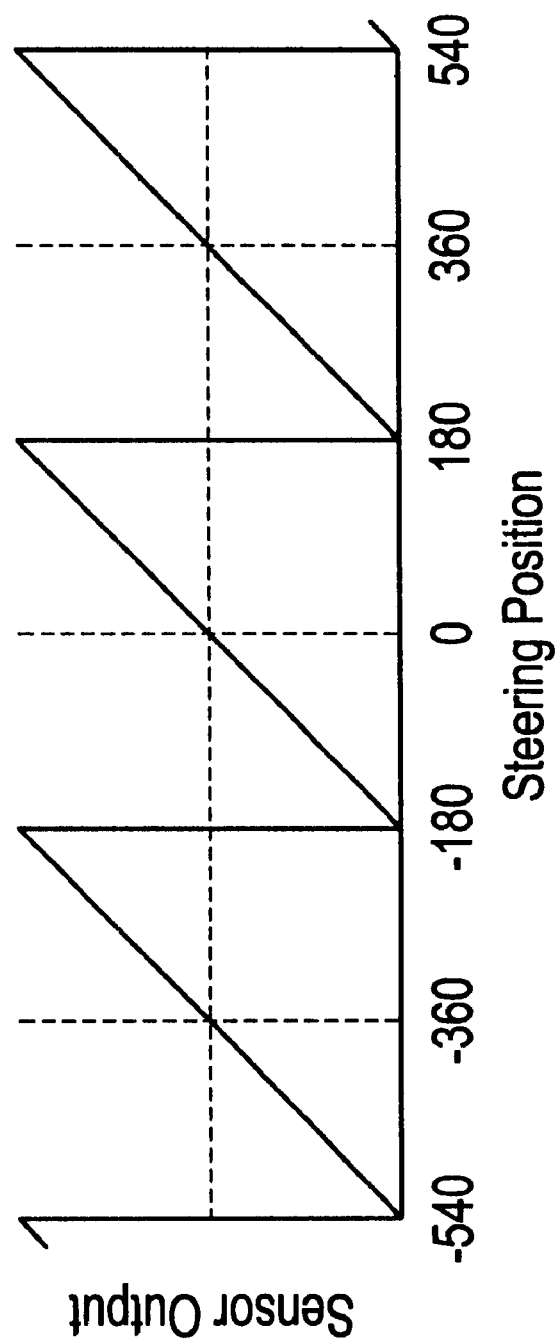
FIG. 2 is a graphical representation of the output signal of a rotational position sensor with a rollover output signal used as a steering angle sensor in the power steering system of FIG. 1.

Sensor 32 is preferably a rotational position sensor which provides an output voltage corresponding to rotational angle through a complete revolution of lower steering shaft 51, and thus of the pinion gear. For purposes of this description, it will be assumed that lower steering shaft 51, the rotating portion of sensor 32 and the pinion gear rotate together, as a unit, through the same rotational angle, to control the direction of steering wheels 42. But it is typical in vehicle steering systems that full rack movement of the steering system 24 may require three to five full turns of steering shaft 51 and the pinion gear, and thus of the rotatable portion of sensor 32. As shown in FIG. 2, sensor 32 provides a unique, continuously varying voltage between rotational positions 180 degrees to the left and right of the center position, at which point the voltage jumps or "rolls over" to repeat the variation with further rotation in the same direction. In other embodiments, sensor 32 may be set up to provide the unique, continuously varying voltage over only half (180 degrees) or some other fraction of one full rotation, thus producing an even greater number of rollover events over the full range of rack movement. Thus, the output signal of sensor 32 by itself is ambiguous in that a given output voltage may correspond to a plurality of rack or steering positions, only one of which is correct. As shown in FIG. 2, the sensor output is the same for 0 degrees (i.e., absolute hand wheel center) as it is for +360 degrees and −360 degrees. Thus, reliance on the hand wheel position sensor alone will not provide the absolute hand wheel center position.

As described herein, conventional techniques use known relationships between hand wheel torque and hand wheel position to determine whether the determined center is the absolute hand wheel center. Under certain driving conditions, however, the known relationships do not apply and the determined center may not be the absolute hand wheel center. Accordingly, an improvement to the conventional process is depicted in FIG. 3. FIG. 3 depicts a method for determining absolute hand wheel center in which certain constraints and thresholds are used to ensure that a determined center represents the absolute hand wheel center. The process may be implemented by controller 16 in response to a computer program stored in a memory device.

As shown in FIG. 3, the process begins at step 100 and flow proceeds to step 102 where the vehicle speed is compared to a first speed threshold. In an exemplary embodiment, the first speed threshold is 16 kph. A low speed threshold is used initially to quickly enable the application of return torque so that the steering feels normal soon after the vehicle starts moving. If the condition at step 102 is met, flow proceeds to step 104 where it is determined whether constraints are met. Two exemplary constraints are shown in FIG. 3 as the hand wheel velocity being less than a hand wheel velocity threshold and the relative position being less than a relative position threshold. To accurately determine hand wheel center position, the hand wheel should remain in relatively the same place. Thus, the need for the evaluation of hand wheel velocity. In addition, the output of the hand wheel position sensor should be close to the output of the hand wheel position sensor at absolute hand wheel center. As noted above, although the hand wheel position sensor has the appropriate output level, the hand wheel may be off absolute center by +−360 degrees.

Upon entering step 104, a timer is initiated. In an exemplary embodiment, the timer is a five second timer, but it is understood that other time values may be used. If the constraints are not met in step 104, the timer is reset at step 106 and flow proceeds to step 102. If the constraints are met at step 104, flow proceeds to step 102 where the speed and constraints are evaluated until the timer expires as determined at step 108. Once step 108 is satisfied, the center is determined using the stored hand wheel torque versus hand wheel position relationships.

Flow proceeds to step 110 where it is determined whether a first center found flag is set. If the process has not yet determined a center position, flow proceeds to step 112 where the center is stored and the first center found flag is set. Flow proceeds to step 114 where the process enables use of return torque by the power steering system and clears a center changed flag. Enabling application of return torque indicates that the process has determined an accurate absolute hand wheel center and that return torque can be accurately applied by the system. The relevance of the center changed flag is described in more detail herein. After step 114, the process returns to step 100.

At step 110, if the first center found flag is set, flow proceeds to step 116 where it is determined whether the current found center differs from the previously found center. The current found center is compared to the previous found center and a difference of greater than a predetermined amount indicates a change. For example, if the equation $$|\text{center}_n - \text{center}_{n-1}| > \text{center change threshold}$$

is met, then a center change is detected at step 116. In an exemplary embodiment, the center change will be a multiple of 360 degrees which corresponds to the roll over angle of the position sensor. If a center change is detected, flow proceeds to step 118 where the current center is stored, application of return torque is disabled and a center change flag is set. The process disables the application of return torque because the absolute hand wheel center has not been determined with required accuracy as indicated by the center change.

If at step 116, a center change is not detected, flow proceeds to step 120. At step 120, the status of the center change flag is determined. If there have been no prior center changes and at step 116 the center did not change, then the stored center accurately represents the absolute hand wheel center and flow proceeds to step 114 where application of return torque is enabled.

If at step 120 it is determined that the center change flag is set, this means that there has been a recent change in the determined center (e.g., between $\text{center}_{n-2}$ and $\text{center}_{n-1}$. Prior to enabling application of return torque, the process confirms that the proper center has been found by flowing to step 122 and determining if the vehicle speed exceeds a second speed threshold. In an exemplary embodiment, the second speed threshold is 45 kph. If the vehicle speed exceeds the second speed threshold, then the current center is considered accurate. For speeds above the second speed threshold, the relationship between hand wheel torque and hand wheel position is primarily between the −180 degree and +180 degree hand wheel positions shown in FIG. 2. Thus, determinations of hand wheel center performed when the vehicle is traveling above the second speed threshold accurately correspond to the absolute hand wheel center or zero degrees in FIG. 2. If the condition in step 122 is met, flow proceeds to step 124 where the current center is stored. If the condition in step 122 is not met, the return torque remains disabled and the process returns to step 100.

The process of FIG. 3 provides for disabling application of return torque until the center position is confirmed to represent the absolute hand wheel center. This prevents the power steering system from applying return torque based on an erroneous determination of absolute hand wheel center position.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for controlling application of return torque in a vehicle power steering system, the method comprising:

detecting a current hand wheel center;

comparing said current hand wheel center to a previous hand wheel center;

detecting a change in hand wheel center in response to said comparing;

controlling application of return torque in response to said detecting a change in hand wheel center.

2. The method of claim 1 further comprising:

setting a center change flag when a difference between said current hand wheel center and said previous hand wheel center exceeds a threshold.

3. The method of claim 2 further comprising:

disabling application of return torque when said difference between said current hand wheel center and said previous hand wheel center exceeds said threshold.

4. The method of claim 2 further comprising:

detecting a subsequent hand wheel center; and enabling application of return torque when a difference between said subsequent hand wheel center and said current hand wheel center is less than said threshold and said center change flag is not set.

5. The method of claim 2 further comprising:

detecting a subsequent hand wheel center; and enabling application of return torque when a difference between said subsequent hand wheel center and said current hand wheel center is less than said threshold and said center change flag is set and said vehicle has a speed exceeding a speed threshold.

6. The method of claim 5 further comprising:

clearing the center change flag.

7. A vehicle power steering system for applying return torque to a steering shaft, the system comprising:

a position sensor for detecting a rotational position of said steering shaft;

a controller coupled to said sensor for receiving a signal indicative of rotation of said steering shaft, said controller:

detecting a current hand wheel center;

comparing said current hand wheel center to a previous hand wheel center;

detecting a change in hand wheel center in response to said comparing;

controlling application of return torque in response to said detecting a change in hand wheel center.

8. The system of claim 7 wherein:

said controller sets a center change flag when a difference between said current hand wheel center and said previous hand wheel center exceeds a threshold.

9. The system of claim 8 wherein:

said controller disables application of return torque when said difference between said current hand wheel center and said previous hand wheel center exceeds said threshold.

10. The system of claim 8 wherein:

said controller detects a subsequent hand wheel center; and said controller enables application of return torque when a difference between said subsequent hand wheel center and said current hand wheel center is less than said threshold and said center change flag is not set.

11. The system of claim 8 wherein:

said controller detects a subsequent hand wheel center; and said controller enables application of return torque when a difference between said subsequent hand wheel center and said current hand wheel center is less than said threshold and said center change flag is set and said vehicle has a speed exceeding a speed threshold.

12. The system of claim 5 wherein said controller:

clears the center change flag.

13. The system of claim 7 further comprising:

a torque sensor for detecting torque on said steering shaft;

said controller determining said current hand wheel center in response to torque on said steering shaft and position of said steering shaft.

14. The system of claim 13 wherein:

said controller detects current hand wheel position in response to a predefined relationship between torque on said steering shaft and position of said steering shaft.

* * * * *